(12) United States Patent
Wright et al.

(10) Patent No.: US 8,983,677 B2
(45) Date of Patent: Mar. 17, 2015

(54) ACOUSTIC FINGERPRINTING OF MECHANICAL DEVICES

(75) Inventors: George L. Wright, Corrales, NM (US); Mark A. Wright, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 1341 days.

(21) Appl. No.: 12/510,129

(22) Filed: Jul. 27, 2009

(65) Prior Publication Data

US 2010/0080086 A1    Apr. 1, 2010

Related U.S. Application Data

(63) Continuation-in-part of application No. 12/243,615, filed on Oct. 1, 2008.

(51) Int. Cl.
*G06F 17/00* (2006.01)
*H04B 11/00* (2006.01)

(52) U.S. Cl.
CPC ................................ *H04B 11/00* (2013.01)
USPC ............... 701/1; 381/71.4; 381/56; 381/57; 381/86

(58) Field of Classification Search
CPC .................................................. G06F 7/00
See application file for complete search history.

(56) References Cited

U.S. PATENT DOCUMENTS

| | | | |
|---|---|---|---|
| 4,619,231 A | 10/1986 | Stolar et al. | |
| 4,635,058 A | 1/1987 | Sutphin | |
| 4,811,308 A * | 3/1989 | Michel | 367/136 |
| 5,235,924 A * | 8/1993 | Slaton et al. | 114/21.3 |
| 5,265,556 A | 11/1993 | Hall | |
| 5,357,484 A * | 10/1994 | Bates et al. | 367/118 |
| 5,410,519 A * | 4/1995 | Hall et al. | 367/127 |
| 5,465,079 A | 11/1995 | Bouchard et al. | |
| 5,481,505 A * | 1/1996 | Donald et al. | 367/130 |
| 5,528,232 A | 6/1996 | Verma et al. | |

(Continued)

FOREIGN PATENT DOCUMENTS

WO    200139152 A1    5/2001
WO    2006/025798 A1    3/2006

OTHER PUBLICATIONS

Wright et al., U.S. Appl. No. 12/022,859, filed Jan. 30, 2008.

(Continued)

*Primary Examiner* — Jonathan M Dager
(74) *Attorney, Agent, or Firm* — Shumaker & Sieffert, P.A.

(57) ABSTRACT

A method and device are presented for identifying machines, such as vehicles, based on acoustic machine signatures. An acoustic sensor generates machine-acoustic data about the machine. A machine-signature identifier receives the machine-acoustic data, determines a machine signature from the machine-acoustic data, and identifies the machine based on the machine signature. A machine-signature database, configured to store multiple machine signatures and/or machine-signature templates, may receive and process queries about machine signatures for machine identification. The machine-signature identifier may generate and send an instruction based on the identified machine. The instruction may instruct application of electronic countermeasures or may permit a vehicle to enter a secured area. An acoustic modulator may generate the machine-acoustic data to act as a machine signature. The acoustic modulator may generate the machine signature using an ultrasonic carrier.

20 Claims, 5 Drawing Sheets

(56) References Cited

U.S. PATENT DOCUMENTS

| | | | |
|---|---|---|---|
| 5,619,616 A * | 4/1997 | Brady et al. | 706/20 |
| 5,661,474 A | 8/1997 | Douglas | |
| 5,704,008 A | 12/1997 | Duvall | |
| 5,721,712 A * | 2/1998 | LaPointe | 367/118 |
| 5,756,182 A | 5/1998 | Landi et al. | |
| 5,757,288 A | 5/1998 | Dixon et al. | |
| 5,760,686 A | 6/1998 | Toman | |
| 5,798,983 A | 8/1998 | Kuhn et al. | |
| 5,809,437 A * | 9/1998 | Breed | 701/31.9 |
| 5,839,759 A | 11/1998 | Trigo | |
| 5,861,799 A | 1/1999 | Szwed | |
| 5,872,526 A | 2/1999 | Tognazzini | |
| 5,917,423 A | 6/1999 | Duvall | |
| 5,939,975 A | 8/1999 | Tsuria et al. | |
| 6,014,447 A * | 1/2000 | Kohnen et al. | 381/86 |
| 6,060,989 A | 5/2000 | Gehlot | |
| 6,072,248 A | 6/2000 | Muise et al. | |
| 6,204,778 B1 | 3/2001 | Bergan et al. | |
| 6,229,988 B1 | 5/2001 | Stapefeld et al. | |
| 6,285,943 B1 | 9/2001 | Boulter | |
| 6,288,651 B1 | 9/2001 | Souza | |
| 6,341,101 B1 * | 1/2002 | Dutton et al. | 367/1 |
| 6,371,000 B1 | 4/2002 | Hutmacher et al. | |
| 6,411,887 B1 | 6/2002 | Martens et al. | |
| 6,504,490 B2 * | 1/2003 | Mizushima | 340/943 |
| 6,559,774 B2 | 5/2003 | Bergan et al. | |
| 6,623,205 B1 | 9/2003 | Ramirez | |
| 6,665,613 B2 | 12/2003 | Duvall | |
| 6,847,825 B1 | 1/2005 | Duvall et al. | |
| 6,876,858 B1 | 4/2005 | Duvall et al. | |
| 6,897,762 B2 | 5/2005 | Howells | |
| 7,027,953 B2 * | 4/2006 | Klein | 702/184 |
| 7,049,709 B2 | 5/2006 | Boggs | |
| 7,061,374 B2 | 6/2006 | Waterman | |
| 7,071,841 B2 * | 7/2006 | Haynes et al. | 340/943 |
| 7,106,211 B2 | 9/2006 | Duvall | |
| 7,129,852 B2 | 10/2006 | Aslund et al. | |
| 7,174,153 B2 | 2/2007 | Ehlers | |
| 7,176,787 B2 | 2/2007 | Herrera et al. | |
| 7,220,076 B2 | 5/2007 | Boll | |
| 7,263,803 B2 | 9/2007 | Herwich et al. | |
| 7,286,929 B2 | 10/2007 | Staton et al. | |
| 7,305,294 B2 | 12/2007 | Bate et al. | |
| 7,315,779 B1 | 1/2008 | Rioux et al. | |
| 7,319,848 B2 | 1/2008 | Obradovich et al. | |
| 7,327,250 B2 | 2/2008 | Harvey | |
| 7,330,103 B2 | 2/2008 | Boss et al. | |
| 7,343,238 B2 | 3/2008 | Nou et al. | |
| 7,363,139 B2 | 4/2008 | Glora et al. | |
| 7,377,715 B2 | 5/2008 | Kruise | |
| 7,382,277 B2 | 6/2008 | Ioli Trust | |
| 7,872,948 B2 * | 1/2011 | Davis et al. | |
| 7,963,254 B2 * | 6/2011 | Patton | |
| 8,111,174 B2 * | 2/2012 | Berger et al. | 340/943 |
| 8,600,627 B2 * | 12/2013 | Beck et al. | 701/50 |
| 2002/0011939 A1 | 1/2002 | Mizushima | |
| 2002/0083060 A1 * | 6/2002 | Wang et al. | 707/10 |
| 2002/0107625 A1 * | 8/2002 | Beck et al. | 701/50 |
| 2004/0081322 A1 * | 4/2004 | Schliep et al. | 381/57 |
| 2004/0167734 A1 * | 8/2004 | Ramillon et al. | 702/76 |
| 2004/0198309 A1 | 10/2004 | Duvall | |
| 2004/0199785 A1 * | 10/2004 | Pederson | 713/200 |
| 2004/0228213 A1 * | 11/2004 | Dutton et al. | 367/1 |
| 2004/0233068 A1 | 11/2004 | Duvall | |
| 2005/0060111 A1 * | 3/2005 | Ramillon et al. | 702/76 |
| 2005/0068199 A1 | 3/2005 | Succi et al. | |
| 2005/0100172 A1 * | 5/2005 | Schliep et al. | 381/71.4 |
| 2005/0178602 A1 | 8/2005 | Bolduc et al. | |
| 2005/0267817 A1 * | 12/2005 | Barton et al. | 705/26 |
| 2006/0007039 A1 | 1/2006 | Duvall | |
| 2006/0122839 A1 * | 6/2006 | Li-Chun Wang et al. | 704/273 |
| 2006/0227664 A1 * | 10/2006 | Horak | 367/136 |
| 2006/0241916 A1 | 10/2006 | Sieracki | |
| 2006/0250272 A1 | 11/2006 | Puamau | |
| 2006/0256650 A1 * | 11/2006 | Lee et al. | 367/13 |
| 2006/0278705 A1 * | 12/2006 | Hedley et al. | 235/384 |
| 2006/0293842 A1 | 12/2006 | Casino | |
| 2007/0008179 A1 * | 1/2007 | Hedley et al. | 340/928 |
| 2007/0256499 A1 * | 11/2007 | Pelecanos et al. | 73/579 |
| 2008/0151793 A1 | 6/2008 | Wright | |
| 2008/0151841 A1 | 6/2008 | Yi et al. | |
| 2008/0151889 A1 | 6/2008 | Yi et al. | |
| 2008/0154482 A1 | 6/2008 | Garcia | |
| 2008/0165018 A1 | 7/2008 | Breed | |
| 2008/0167821 A1 | 7/2008 | Breed | |
| 2008/0181056 A1 * | 7/2008 | Bernecky | 367/21 |
| 2008/0208891 A1 * | 8/2008 | Wang et al. | 707/102 |
| 2008/0257047 A1 * | 10/2008 | Pelecanos et al. | 73/587 |
| 2008/0316862 A1 * | 12/2008 | Bernecky et al. | 367/131 |
| 2009/0005920 A1 | 1/2009 | Colomer | |
| 2009/0072972 A1 * | 3/2009 | Pederson | 340/541 |
| 2009/0102683 A1 | 4/2009 | May | |
| 2009/0115635 A1 * | 5/2009 | Berger et al. | 340/943 |
| 2009/0157293 A1 * | 6/2009 | Cornett et al. | 701/200 |
| 2009/0257314 A1 * | 10/2009 | Davis et al. | 367/125 |
| 2010/0142715 A1 * | 6/2010 | Goldstein et al. | 381/56 |
| 2010/0280773 A1 * | 11/2010 | Saether | 702/58 |
| 2010/0284249 A1 * | 11/2010 | Steadman | 367/118 |
| 2011/0130915 A1 | 6/2011 | Wright et al. | |
| 2011/0169664 A1 * | 7/2011 | Berger et al. | 340/943 |
| 2011/0285842 A1 * | 11/2011 | Davenport et al. | 348/116 |

OTHER PUBLICATIONS

Unitracking Industries Inc., Unitracking VTU GPS, Dec. 1, 2007, printed from the Internet on Oct. 1, 2008 at http://unitracking.com/demo.html.

Zach Gale, OnStar's Stolen Vehicle Slowdown Can Cut Engine Power, Oct. 9, 2007, printed from the Internet on Oct. 1, 2008 at http://blogs.motortrend.com/6218134/technology/onstars-stolen-vehicle-slowdown-can-cut-engine-power/index.html.

CNN, Flamethrower Now an Option on S. African Cars, Dec. 11, 1998, printed from the Internet on Oct. 1, 2008 at http://www.cnn.com/WORLD/africa/9812/11/flame.thrower.car/.

ITERIS, Vehicle Sensors—Automotive Safety Solutions, printed from the Internet on Sep. 25, 2008 at http://www.iteris.com/upload/datasheets/AutovueBrochure_FINAL_web.pdf.

U.S. Department of Transportation and ITERIS, ATMS18-Reversible Lane Management (Market Package), Apr. 23, 2007, printed from the Internet at: http://www.iteris.com/itsarch/html/mp/mpatms18.htm.

U.S. Department of Transportation and Iteris, ATMS18-Reversible Lane Management, Transaction Set Diagram, Apr. 23, 2007, printed from the Internet at: http://www.iteris.com/itsarch/html/ts/tsatms18-1.htm.

Samtech Middle East, Wireless Vehicle Tracking & Fleet Management Solutions, 2005, printed from the Internet on Oct. 1, 2008 at: http://www.samtech-me.com/Solutions.aspx.

Enovia Business Solutions, GeoSense Fleet™ Complete Authomated Vehicle Location Platform, 2008, printed from the internet on Oct. 1, 2008 at: http://enovia.ca/site/GeoSenseFleet.php.

Edmunds Inc., Tech Watch: "Vehicle Management" System Ushers in Big Brother Era for Teens, Sep. 17, 2007, available at: http://www.edmunds.com/insideline/do/News/articleId=122658 (last visited Oct. 1, 2008).

Geosoft USA, GPS Tracking Systems and Vehicle Tracking, 2006, printed from the internet on Oct. 1, 2008 at:http://www.geosoftusa.com/.

Pell, "Quick, Kitt—Call the Cops", Sunday Times (UK), p. 10, May 18, 2008, London, UK.

L. Greenemeier, "A Positioning System That Goes Where GPS Can't", Scientific American, News, Jan. 23, 2008, available at http://www.scientificamerican.com/article.cfm?id=indoor-positioning-system&print=true (last visited May 31, 2009).

Sonitor Technologies, "P-Tag Datasheet", Feb. 2008, available at http://www.sonitor.com/downloads/files/Sonitor_P-Tag_Datasheet.pdf (last visited May 31, 2009).

Sonitor Technologies, "E-Tag Datasheet", Aug. 2008, available at http://www.sonitor.com/downloads/files/Sonitor_E-Tag_Datasheet.pdf (last visited May 31, 2009).

(56) References Cited

OTHER PUBLICATIONS

Sonitor Technologies, "Health Brochure 2007", 2007, available at http://www.sonitor.com/downloads/files/Health_Brochure_2007.pdf (last visited May 31, 2009).

B. Guo et al., "Acoustic Information Fusion for Ground Vehicle Classification", 11th International Conference on Information Fusion, Jun. 30, 2008—Jul. 3, 2008, pp. 1-7, Cologne, Germany.

M. E. Munich, "Bayesian Subspace Methods for Acoustic Signature Recognition of Vehicles", Proceedings of the 12th European Signal Processing Conference (EUSIPCO), Sep. 6-10, 2004, Vienna, Austria.

B. Lu et al., "Perimeter Security on Detecting Acoustic Signature of Approaching Vehicle Using Nonlinear Neural Computation", 2008 IEEE Conference on Technologies for Homeland Security, pp. 51-56, May 12-13, 2008, Waltham, MA.

A. Averbuch et al., "A Diffusion Framework for Detection of Moving Vehicles", Jun. 21, 2008, School of Computer Science, Tel Aviv University, available at http://www.cs.tau.ac.il/~amir1/PS/RamdonAcoustics.pdf (last visited Jul. 12, 2009).

Smartek Systems, Inc., "SmarTek Acoustic Sensor-Version 1 (SAS-1) as a Vehicle Direction Indicator", Dec. 1, 1998, available at http://www.smarteksys.com/wrngway0.pdf (last visited Jul. 14, 2009).

A. Y. Nooralahlyan et al., Abstract of "A Field Trial of Acoustic Signature Analysis for Vehicle Classification", pp. 165-177, Transportation Research Part C: Emerging Technologies, vol. 5, issues 3-4, Aug. 10, 1997.

J. Ding et al., "Signal Processing of Sensor Node Data for Vehicle Detection", 2004 IEEE Intelligent Transportation Systems Conference, pp. 70-75, Oct. 3-6, 2004, Washington, DC, available at http://path.berkeley.edu/~singyiu/vehicledetection/publications/documents/ITSC_2004_0013_MoC3.4.pdf (last visited Jul. 14, 2009).

S.B. Hong et al., Abstract of "A Computational Approach for Evaluating the Acoustic Detection of a Military Vehicle", Document No. 2005-01-2337, May 2005, SAE International, available at http://www.sae.org/servlets/productDetail?PROD_TYP=PAPER&PROD_CD=2005-01-2337 (last visited Jul. 14, 2009).

E.P. Lam et al, Abstract of "Acoustic Signature Recognition with Wavelet Analysis", Signal and Image Processing (SIP) 2008, Track 623-194, Aug. 18-20, 2008, Kailua-Kona, HI, USA, available at http://www.actapress.com/Abstract.aspx?paperId=33772 (last visited Jul. 14, 2009).

B. Lu et al., Abstract of "Nonlinear Hebbian Learning for noise-independent vehicle sound recognition", IEEE International Joint Conference on Neural Networks (IJCNN) 2008, pp. 1336-1343, Hong Kong, China, available at http://ieeexplore.ieee.org/search/freesrchabstract.jsp?arnumber=4633971&isnumber=4633757&punumber=4625775&k2dockey=4633971@ieeecnfs (last visited Jul. 14, 2009).

S. Y. Cheung, "Signal Analysis", available at http://path.berkeley.edu/~singyiu/vehicledetection/research/acoustic/detection.htm (last visited Jul. 14, 2009).

U.S. Appl. No. 12/354,311 entitled "Image Search Enhanced Vehicle Telemaintenance", filed Jan. 15, 2009.

LoJack, "How LoJack Works", http://www.lojack.com/motorcycle/pages/motorcycle-works.aspx, printed Oct. 1, 2008, 1 page.

Office Action dated Jun. 4, 2012, U.S. Appl. No. 12/243,615, (15 pages).

Restriction Requirement dated Mar. 26, 2012, U.S. Appl. No. 12/243,615, (5 pages).

Response dated Apr. 24, 2012, U.S. Appl. No. 12/243,615, (7 pages).

Responsive amendment dated Aug. 30, 2012, for U.S. Appl. No. 12/243,615, 10 pages.

\* cited by examiner

US 8,983,677 B2

ACOUSTIC FINGERPRINTING OF MECHANICAL DEVICES

RELATED APPLICATIONS

The present application is a continuation-in-part of U.S. patent application Ser. No. 12/243,615 entitled "Errant Vehicle Countermeasures", filed Oct. 1, 2008 ("the Errant Vehicle Application"), which is entirely incorporated by reference herein for all purposes.

BACKGROUND OF THE INVENTION

1. Field of the Invention

This invention relates to the field of vehicle identification. More particularly, this invention relates to use of sound in identifying and tracking vehicles, and methods based on identification of the vehicles using acoustic machine signatures.

2. Background

Mechanical systems, such as vehicles, frequently are identified for a variety of reasons. Commonly, vehicle identification and tracking relies upon visually-related data, such as make/model information or license plate data. At times, such as in low-light or no-light situations, gathering visually-related data may be difficult or impossible. Also, visually-related data such as license plates or vehicle color may be changed to deflect efforts to identify a vehicle. Once visually-related data has been changed, visual vehicle identification may be difficult or impossible.

Typically, unless significant mechanical change or wear occurs, an "acoustic signature" or "machine signature" generated during operation of the vehicle generally remains consistent over the life of the vehicle. The acoustic signature includes the sound of the engine in operation as well as the sound of the wheels of the vehicle traversing a known surface. Discussions of identification of vehicles using acoustic signatures may be found in: B. Guo et al., "Acoustic Information Fusion for Ground Vehicle Classification", 11$^{th}$ International Conference on Information Fusion, pp. 1-7, Jun. 30, 2008- Jul. 3, 2008, Cologne, Germany ("Guo"), M. E. Munich, "Bayesian Subspace Methods for Acoustic Signature Recognition of Vehicles", Proceedings of the 12th European Signal Processing Conference (EUSIPCO), pp. 2107-2110, Sep. 6-10, 2004, Vienna, Austria ("Munich"), and B. Lu et al., "Perimeter Security on Detecting Acoustic Signature of Approaching Vehicle Using Nonlinear Neural Computation", 2008 IEEE Conference on Technologies for Homeland Security, pp. 51-56, May 12-13, 2008, Waltham, Mass. ("Lu"). Guo, Munich, and Lu are all entirely incorporated by reference herein for all purposes.

SUMMARY

A first aspect of the invention is a method. Machine-acoustic data about a machine is received. A machine signature based on the machine-acoustic data is determined. The machine is identified based on the machine signature. An instruction is sent that is based on the identified machine.

A second aspect of the invention is a machine-signature identifier. The machine-signature identifier includes a processor, data storage, a network-communication interface, and machine language instructions. The machine language instructions are stored in the data storage and executable by the processor to perform functions. The functions include: (a) receiving machine-acoustic data about a machine, (b) determining a machine signature based on the machine-acoustic data, (c) identifying the machine based on the machine signature, (d) generating an instruction based on the identified machine, and (e) sending the instruction via the network-communication interface.

BRIEF DESCRIPTION OF THE DRAWINGS

Various Examples of Embodiments are Described Herein with Reference to the Following Drawings, Wherein Like Numerals Denote Like Entities, in which.

DETAILED DESCRIPTION

Figure 1:
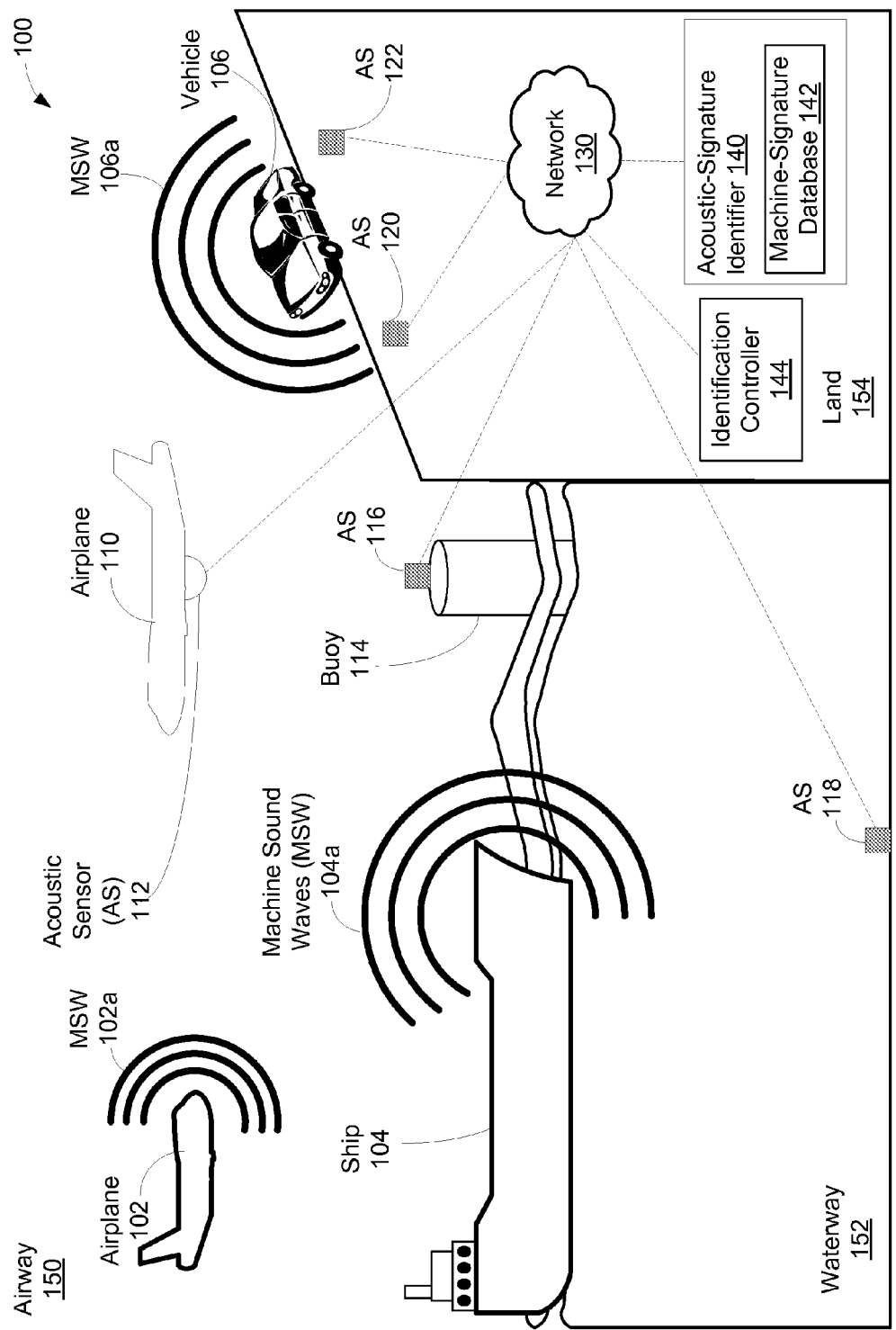
FIG. 1 shows an example scenario where acoustic data of multiple machines are generated and processed by an acoustic-signature identifier, in accordance with the invention.

The present invention includes an acoustic-signature identifier configured to identify machines based on a machine signature of the machine and to send instructions based on the identification of the machine. The acoustic-signature identifier may generate an input-machine signature based on machine-acoustic data. The machine-acoustic data may include audio data of the machine in operation and/or data provided by one or more acoustic modulators. The machine-acoustic data may be generated by one or more acoustic sensors.

The acoustic-signature identifier may identify the machine using the input-machine signature. The machine may be identified based on a comparison of the input-machine signature to one or more stored-machine signatures. A machine-signature database may store the stored-machine signatures. The machine-signature database may retrieve and provide one or more stored-machine signatures, perhaps based on a query. The machine-signature database and/or the acoustic-signature identifier may store additional information with a stored-machine signature, such as but not limited to identification information about a machine associated with the stored-machine signature. As such, the identification information associated with a stored-machine signature corresponding to an input-machine signature may identify the machine.

The identification information may include a "complete identification" and/or a "partial identification". A complete identification is an identification that identifies a specific machine. A partial identification is an identification that partially, but not completely matches, a specific machine. For example, suppose an input-machine signature was derived from machine-acoustic data for operation of a lathe. A partial identification of the lathe may indicate that it is an East Creek Brand 13" Lathe, while a complete identification of the same lathe may indicate that it is an East Creek Brand 13" Lathe, Model EBL13-A with serial number EBL-13A1-87048. Identification information may include partial and/or complete matching information. Identification information may include textual information, audio information (e.g., the input-machine signature and/or one or more stored-machine signatures), video information (e.g., still and/or moving pictures), and/or other information.

The partial identification may include a "matching confidence index". Continuing the above example, the matching confidence index may indicate that the partial identification of an East Creek Brand 13" Lathe is 80% accurate. In some circumstances, a matching confidence index may be provided with a complete identification; e.g., the matching confidence index may indicate that the complete identification of the same lathe as an East Creek Brand 13" Lathe, Model EBL13-A with serial number EBL-13A1-87048 is 57% accurate and perhaps a second complete match that the East Creek Brand 13" Lathe, Model EBL13-A has serial number EBL-13A2-12345 is 22% accurate. The matching confidence index may be provided by use of probabilistic matching techniques of input-machine signatures with stored-machine signatures, such as but not limited to the non-linear Hebbian learning technique described in Lu, the probabilistic matching techniques of Munich, and/or the technique of fusing a multivariate Gaussian classifier and support vector machine of Guo. Other techniques for indicating a matching confidence index of a partial or complete identification are possible as well.

Additionally, partial and/or compete identification may comprise use of a machine-aging model. The machine-aging model may be used to simulate or otherwise age an input-machine signature derived from relatively old data. For example, suppose an input-machine signature was based on two-year-old machine-acoustic data. A machine-aging model may be used to simulate wear by updating the machine-acoustic data based on models of wear and their effects on machine sounds. Additionally or instead, the machine-aging model may include one or more "delta signatures" to be applied to the relatively-old input-machine signature. Delta signatures, derived from changes in machine signatures over time, are discussed below in more detail.

The acoustic-signature identifier may generate an instruction for the identified machine. The instruction may be informational; that is, it may include part or all of the identification information related to the identified machine. In some scenarios, the acoustic-signature identifier may supplement the identification information by performing additional searches based on the identification information; e.g., search for ownership information of an identified vehicle based on identification information for the identified vehicle.

The instruction may be a command to apply a countermeasure to the identified machine. Countermeasures and the application of countermeasures are discussed in more detail in the Errant Vehicle Application. See the discussion of FIGS. 2 and 3 below for example scenarios where the instruction may be a command to apply a countermeasure.

The instruction may be a command or notification that the identified machine is permitted or denied entry into a secured area. For example, construction equipment may be identified and permitted entry into a jobsite only when each piece of construction equipment is identified. In some circumstances, the command or notification that the identified machine is permitted or denied entry may include a request for additional identification information. The discussion of FIG. 3 below indicates another example where the instruction indicates permission or denial of entry into a secured area.

The instruction may also be a "combined instruction" that combines two or more of the herein-described instructions. For example, an instruction to deny entry into a secured area may be combined with an instruction to apply countermeasures and/or an informational instruction. Other combined instructions are possible as well.

The use of machine signatures to identify machinery prior to entry into a secured area permits for easy identification—the machine merely has to operate long enough for an acoustic sensor to gather machine-acoustic data. Therefore, no other identification material need be provided. As it is difficult to change machine-acoustic data, identification of machines based on machine signatures is a robust and secure technique for identification.

The use of acoustic modulators may both aid the identification of machines based on machine signatures and provide additional techniques for encoding identification data. Additionally, acoustic modulators that operate at ultrasonic frequencies (e.g., a frequency between approximately 20 kilohertz (kHz) and 1 megahertz (MHz)) encounter few broadcast restrictions while being undetectable by casual observers.

Example Scenario for Identifying Multiple Machines

Turning to the figures, FIG. 1 shows an example scenario 100 where acoustic data of multiple machines 102, 104, and 106 are generated and processed by an acoustic-signature identifier 140, in accordance with the invention.

Scenario 100 involves airplane 102 flying through airway 150, ship 104 sailing through waterway 152 and motor vehicle 106 traveling on land 154. Each of these machines—airplane 102, ship 104, and motor vehicle 106—generates sound waves termed "machine sound waves" (MSW) herein as part of their operation.

The machine sound waves 102a generated by airplane 102 may be detected by an acoustic sensor (AS) 112 aboard airplane 110. Similarly, machine sound waves 104a generated by ship 104 may be detected by acoustic sensor(s) 116 and/or 118 and machine sound waves 106a generated by vehicle 106 may be detected by acoustic sensor(s) 120 and/or 122. In some scenarios, additional sensors may detect machine sound waves; for example, acoustic sensors 112, 120, and/or 122 additionally may detect machine sound waves 104a. Similarly, acoustic sensors 116, 118, 120, and/or 122 additionally may detect machine sound waves 102a and acoustic sensors 112, 116, and/or 118 additionally may detect machine sound waves 106a.

Each acoustic sensor 112, 116, 118, 120, and 122 may be or include one or more microphones or other devices configured to gather acoustic data. Some acoustic sensors (e.g., acoustic sensor 118) may be configured to detect machine sound waves carried by water, such as waterway 152. Other acoustic sensors, such as acoustic sensors 112, 116, 120, and 122, may be configured to detect machine sound waves carried by air such as airway 150 and/or via land-based vibrations, such as vibrations through land 154. The acoustic data may be in one or more frequency ranges, such as the audible frequency range (e.g., 4 Hertz (Hz)-20,000 Hz). The frequency range(s) used may depend on a sensitivity of the acoustic sensor(s) used to generate the data. Each acoustic sensor 112, 116, 118, 120, and 122 may be configured to be static or to be portable.

Upon detection of machine sound waves, an acoustic sensor may generate machine-acoustic data. The machine-acoustic data may be digital and/or analog data representing a record of the machine sound waves. For example, suppose acoustic sensor 112 is configured to generate digital data. Then, upon detection of machine sound waves 102a, acoustic sensor 112 may sample and/or otherwise digitally generate digital machine-acoustic data representing machine sound waves 102a.

An acoustic sensor may be configured to send the machine-acoustic data to an acoustic-signature identifier. Each of acoustic sensors 112, 116, 118, 120, and 122 may be connected to the acoustic-signature identifier 140 either directly or indirectly via a wired and/or wireless connection(s). FIG. 1 shows, using dashed lines, communication of machine-acoustic data from each of acoustic sensors 112, 116, 118, 120, and 122 to acoustic-signature identifier 140 via an indirect connection through network 130. In embodiments not shown in FIG. 1, one or more of acoustic sensors 112, 116, 118, 120, and 122 are connected directly to acoustic-signature identifier 140 (i.e., without an intervening network such as network 130).

The acoustic-signature identifier 140 may determine a machine signature based on the machine-acoustic data. The machine signature may be generated using various audio signal processing techniques, such as but not limited to extraction of key wavelengths in accordance with key frequency feature vectors as described in Guo, Mel frequency cepstral computation, use of front-end analysis and back-end recognition of Munich, Fourier analysis, wavelet decomposition, and/or gammatone filterbanks such as described in Lu. Other audio signal processing techniques are possible as well.

For example, the machine-acoustic data may be filtered, amplified, and/or otherwise modulated, perhaps to remove noise from machine-acoustic data prior to generating the machine signature. Similarly, the acoustic-signature identifier 140 may apply other audio signal processing techniques to the machine signature as well. The acoustic-sensor identifier may have one or more processors (e.g., general purpose processors, digital signal processors, and/or neural processors) designated to execute any required audio signal processing techniques to generate a machine signature. Also, the discussion below with regard to FIG. 3 describes determination of machine signatures using acoustic modulators.

Acoustic-signature identifier 140 may store the machine signature and/or the machine-acoustic data using machine-signature database 142. Along with machine signatures and/or machine-acoustic data, the machine-signature database 142 may store identification information for a machine associated with the machine signatures and/or machine-acoustic data. The identification information may include, but is not limited to, manufacturer information, model information, age, date, time, size, shape, weight, color, vehicle identification number(s) (VINs), other identification number(s), license plate or other licensing information, serial numbers, part numbers, and/or any other information that may be used to identify a machine associated with a machine signature and/or machine-acoustic data.

In some circumstances, machine signatures for a given machine may be updated and/or refined by multiple observations of the given machine. For example, an acoustic sensor may initially record the given machine and generate a first or "baseline" set of machine-acoustic data. In some cases, the manufacturer of the given vehicle or maintenance facility frequented by the given vehicle (e.g., a motor pool or mechanic) may capture the baseline-machine-acoustic data. In other cases, other acoustic sensors may capture the baseline-machine-acoustic data, such as sounds of a machine captured via a telephone or other recording device. The acoustic-signature identifier 140 may generate a baseline-machine signature from the baseline-machine-acoustic data. In addition, the acoustic-signature identifier 140 may store the baseline-machine signature and perhaps the baseline-machine-acoustic data in machine-signature database 142.

Then, at one or more later times, acoustic sensor(s) may capture updated-machine-acoustic data for the given vehicle. The acoustic-signature identifier 140 may generate an updated-machine signature based on the updated-machine-acoustic data, perhaps using the above-described audio processing techniques. The acoustic-signature identifier 140 may then compare the updated-machine signature with the baseline-machine signature to determine changes in the machine signature for the given vehicle. For example, the updated-machine signature may be processed to cancel out or otherwise remove the baseline-machine signature to determine a delta signature. The delta signature may be used to readily identify a vehicle. The acoustic-signature identifier 140 may store the updated-machine-acoustic data, the updated-machine signature and/or the delta signature, perhaps in a machine-signature database.

For example, the acoustic-signature identifier 140 generated a "January 1 delta signature" for the given vehicle on Jan. 1, 2010. Then, suppose updated-machine-acoustic data were received on Jan. 3, 2010. The baseline-machine signature may be cancelled out or otherwise removed from updated-machine-acoustic data from Jan. 3, 2010 to generate a "January 3 delta signature" may be compared to the delta signature of Jan. 1, 2010. As the January 1 delta signature and January 3 delta signature represent data that is only two days apart, comparisons of the January 1 delta signature and January 3 delta signature may be easier to perform than comparisons of the updated-machine-acoustic data from Jan. 3, 2010 and the baseline-machine signature for the given vehicle.

In some circumstances, the updated-machine-acoustic data may be used to "rebaseline" the vehicle by generating an updated-baseline-machine signature. Delta signatures may be used to rebaseline the baseline-machine signature. For example, a delta signature based on observations taken after mechanical changes such as maintenance or repair may be used to update the baseline-machine signature. The delta signature may be taken from a different machine and/or generated based on a machine-aging model. For example, suppose a two-year old machine-acoustic data from a suspect vehicle owned by a suspected criminal was obtained. Further suppose that it was learned that the suspect vehicle had been repaired to replace a faulty cylinder but the acoustic data for the suspect vehicle after the repair was unavailable. Then, a delta signature of a repair of the faulty cylinder taken from a vehicle similar to the suspect vehicle may be applied to the baseline-machine signature of the suspect vehicle. The delta signature of the repair may be generated by a machine-aging model that simulates the effect on machine-acoustic data for the repair. In other circumstances, updated-machine-acoustic data may be used to generate an updated-machine signature, which may in turn be stored as the baseline-machine signature.

The acoustic-signature identifier 140 may determine an identity of a machine based on the machine signature. The acoustic-signature identifier 140 may compare an input-machine signature generated by input-machine-acoustic data to one or more stored-machine signatures. The stored-machine signatures may be stored in machine-signature database 142. For example, the acoustic-signature identifier 140 retrieve one or more machine signatures from machine-signature database and compare the input-machine signature to each retrieved-machine signature.

One such comparison technique involves identifying one or more frequency and/or amplitude responses in the input-machine signature and comparing the frequency and/or amplitude responses of each retrieved-machine signature. For example, suppose the input-machine signature had amplitude peaks at 180 and 1000 Hz. Then, for a retrieved-machine signature to match the input-machine signature, the retrieved-machine signature must have same or similar frequency responses at 180 and 1000 Hz. Another comparison technique involves comparing delta signatures as described above. Additionally, the machine-signature database 142 may be configured to accept queries based on frequency responses;

e.g., the machine-signature database 142 may be configured to retrieve only machine signatures with frequency responses at specified frequencies and/or at specific amplitudes. Many other comparison, storage, and querying techniques are possible as well.

The acoustic-signature identifier 140 and/or the machine-signature database 142 may store one or more "machine-signature templates". Each machine-signature template may include one or more indications of frequency responses at specified frequencies and/or at specific amplitudes. The indications may include frequency and/or amplitude ranges; e.g., a frequency response between 160-185 Hz with an amplitude range of +3 or above. The machine-signature template may be generated for particular types of machines (e.g., trucks, cars, milling equipment), particular models/makes of machines (e.g., BND brand automobiles, Bacardo R-151 trucks, M1 Abrams tank), particular manufacturing year or group (e.g., 1969 Bacardo R-151 trucks, M1 Abrams tank—series A1), and/or by other classifications.

The use of machine-signature templates may speed a search for a machine signature. For example, the acoustic-signature identifier 140 may first compare an input-machine signature to one or more high-level machine signature templates (e.g., templates for motor vehicles, heavy-duty equipment, trains, ships, etc.). Upon finding a match between the input-machine signature and a given high-level machine-signature templates leading to a partial or complete identification, one or more related machine-signature templates may be retrieved based on the given high-level machine-signature templates. This process may be continued until a specific machine-signature is found that matches the input-machine signature.

Also, the use of "query limitations", which include additional identification information correlated to the machine-signature templates, may guide the search for a machine signature. For example, if it is known that the input-machine signature is from a 1972 R-151 Bacardo truck, then the acoustic-signature identifier 140 may begin searching for machine signatures related to a machine-signature template for a 1972 R-151 Bacardo truck. The acoustic-signature identifier 140 may repeatedly process query limitations with different levels of precision. For example, if the input query limitation of a "1972 R-151 Bacardo" is used by the acoustic-signature identifier 140 to start a search for all 1972 R-151 Bacardo trucks and a complete identification of the input-machine signature may be made the acoustic-signature identifier 140 may restart the search with query limitations with less precision; e.g., query limitations that indicate the vehicle is a "Bacardo truck" or an "R-151 Bacardo truck".

Query limitations and responses to queries with query limitations are described in the context of visual searches in U.S. patent application Ser. No. 12/354,311 entitled "Image Search Enhanced Vehicle Telemaintenance", filed Jan. 15, 2009 ("the Image Search Application"), which is entirely incorporated by reference herein for all purposes.

Matching confidence indices may be provided for each partial and/or complete identification made by the acoustic-signature identifier 140. In particular, machine confidence indices may be used if probabilistic techniques are used as part of a search strategy and/or algorithm(s) used by acoustic-signature identifier 140.

As such, machine signatures may be stored by the machine-signature database 142 to reflect this hierarchical or tree-oriented structure, according to high-level machine-signature template/related machine-signature template associations. Note that a hierarchical or tree-oriented structure may be stored in an underlying relational database or other database used to implement machine-signature database 142 by use of appropriate referencing techniques that does not inherently involve a hierarchical or tree-oriented structure.

Once the machine has been identified, the acoustic-signature identifier 140 may send an instruction via network 130 to one or more devices (devices not shown in FIG. 1). The instruction may be informational indicating the identity of the vehicle; e.g., a message indicating airplane 102 has identifier "N945Q" and has make and model information of "a Flamethrower model light aircraft", ship 104 is the "S.S. Wrighteous Minnow", or vehicle 106 has license plate number "BR-584" and has make and model information of "BND Caper". Other types of information may be included with the informational instruction as well. The instruction may be an instruction to apply a countermeasure to the vehicle, including application of an escalation strategy, described in more detail in the Errant Vehicle Application as well as described below with respect to FIGS. 2 and 3. The instruction may be an instruction to admit or deny admission to the vehicle, such as described below in more detail with respect to FIG. 3. The instruction may include combinations of the above-mentioned instructions; e.g., an instruction can include information indicating the identity of the vehicle and permit admission of the vehicle. Also, the acoustic-signature identifier 140 may display, log, store and/or send copies of the instruction or information based on the instruction as well.

The acoustic-signature identifier 140 may communicate instructions directly or via a network, such as network 130. Also or instead, machine-signature database 142 may be resident in one or more processors separate from the processor(s) utilized by acoustic-signature 140. Part or all of network 130 may be a warning network, such as described in the Errant Vehicle Application.

The network 130 may include one or more local networks, such as a local area network (LAN), wireless LAN, public local network, private local network and/or secure local area network, and/or one or more wide area networks (WANs), such as a wired WAN, a wireless WAN, a public WAN (e.g., the Internet), a secure WAN, and/or a private WAN, or both local and wide area networks.

The acoustic-signature identifier 140 may in turn be controlled by identification controller 144. The identification controller 144 may indicate which vehicle(s) are to be identified, types and numbers of instructions to be provided, and/or other controls of the acoustic-signature identifier 140. Also, identification controller 144 may control machine-signature database 142, perhaps by providing data and/or instructions for storage and/or retrieval (e.g., machine signatures, machine-acoustic data, queries, and/or instructions to store data). FIG. 1 shows identification controller 144 connected to acoustic-signature identifier 140 and machine-signature database 142 via network 130. In some embodiments, identification controller 144, machine-signature database 142, and/or acoustic-signature identifier 140 may be directly connected. In other embodiments, the same processor(s) that perform the functionality of identification controller 144 may perform the functionality of machine-signature database 142 and/or acoustic-signature identifier 140.

Note that while the observed machines (airplane 102, ship 104, and vehicle 106) shown in FIG. 1 are vehicles, the herein-described techniques and devices may be applied and used with other machines as well, such as but not limited to other vehicles (e.g., trucks, military vehicles, buses, trolleys, trains, aircraft, bulldozers, snowmobiles) as well as other types of machines that generate identifiable sounds during operation (e.g., construction equipment, factory equipment, generators).

Example Scenario for Applying Countermeasures to a Subject Vehicle

Figure 2:
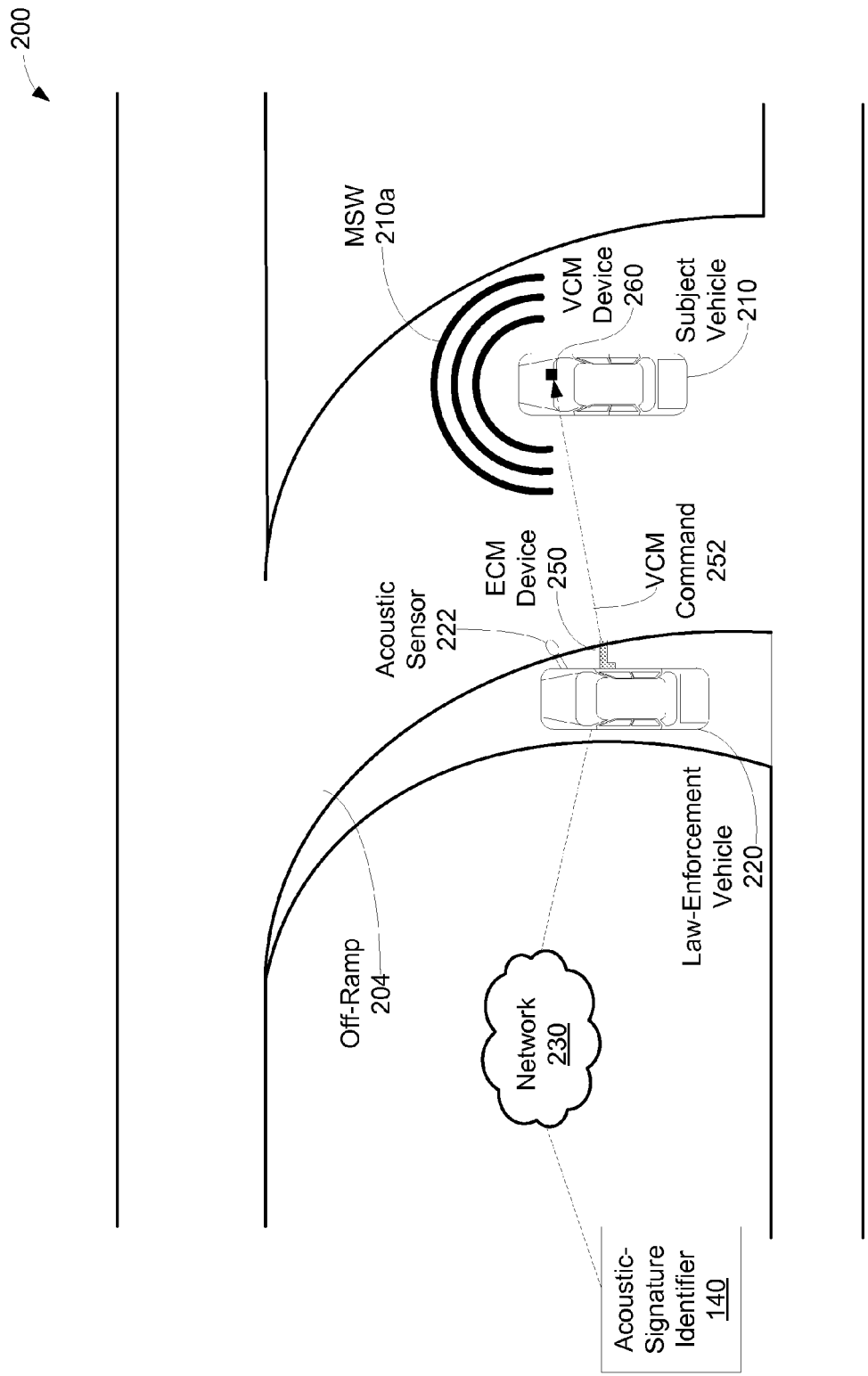
FIG. 2 shows an example scenario in which an electronic countermeasure (ECM) device could apply countermeasures to a subject vehicle based on a machine signature, in accordance with the invention.

FIG. 2 shows an example scenario 200 in which an electronic countermeasure (ECM) device 250 could apply countermeasures to a subject vehicle 210 based on a machine signature, in accordance with the invention.

The scenario shown in FIG. 2 includes a law-enforcement vehicle 220 parked along a shoulder of off-ramp 204. A vehicle is determined to be a subject vehicle 210 by generation of a machine signature based on machine sound waves 210a from vehicle 210. The machine signature may be generated using acoustic sensor 222. The acoustic sensor 222 may observe the machine sound waves 210a and generate machine-acoustic data based on the techniques described above with respect to FIG. 1. In some scenarios, a law-enforcement officer stationed within the law-enforcement vehicle 220 may use his/her judgment to determine that the vehicle 210 is a subject vehicle.

Upon identification vehicle 210 as a subject vehicle, the machine-acoustic data may be sent from acoustic sensor 222 may be sent to acoustic-signature identifier 140, perhaps via network 230. The acoustic-signature identifier 140 may identify vehicle 210 and generate and send a corresponding instruction using the techniques described above with respect to FIG. 1 and/or described below with respect to FIG. 3 regarding acoustic modulators. In the scenario shown in FIG. 2, the corresponding instruction indicates that the subject vehicle 210 is to be subject to countermeasures. In other scenarios, the corresponding instruction may be an informational instruction.

Upon determination that the subject vehicle 210 is to be subject to electronic counter measures, an electronic countermeasure may be applied to the subject vehicle 210. FIG. 2 shows application of an electronic countermeasure involving an electronic-countermeasure (ECM) device 250 sending a vehicle-countermeasure (VCM) command 252 to a vehicle-countermeasure device 260 located in the errant vehicle 214. The electronic countermeasures, ECM device 250, VCM command 252, and vehicle-countermeasure device 260 are described in more detail in the Errant Vehicle Application.

In other scenarios not shown in FIG. 2, countermeasures other than electronic countermeasures may be applied to vehicle 210. The Errant Vehicle Application describes these other countermeasures in more detail.

An Example Security Area Scenario

Figure 3:
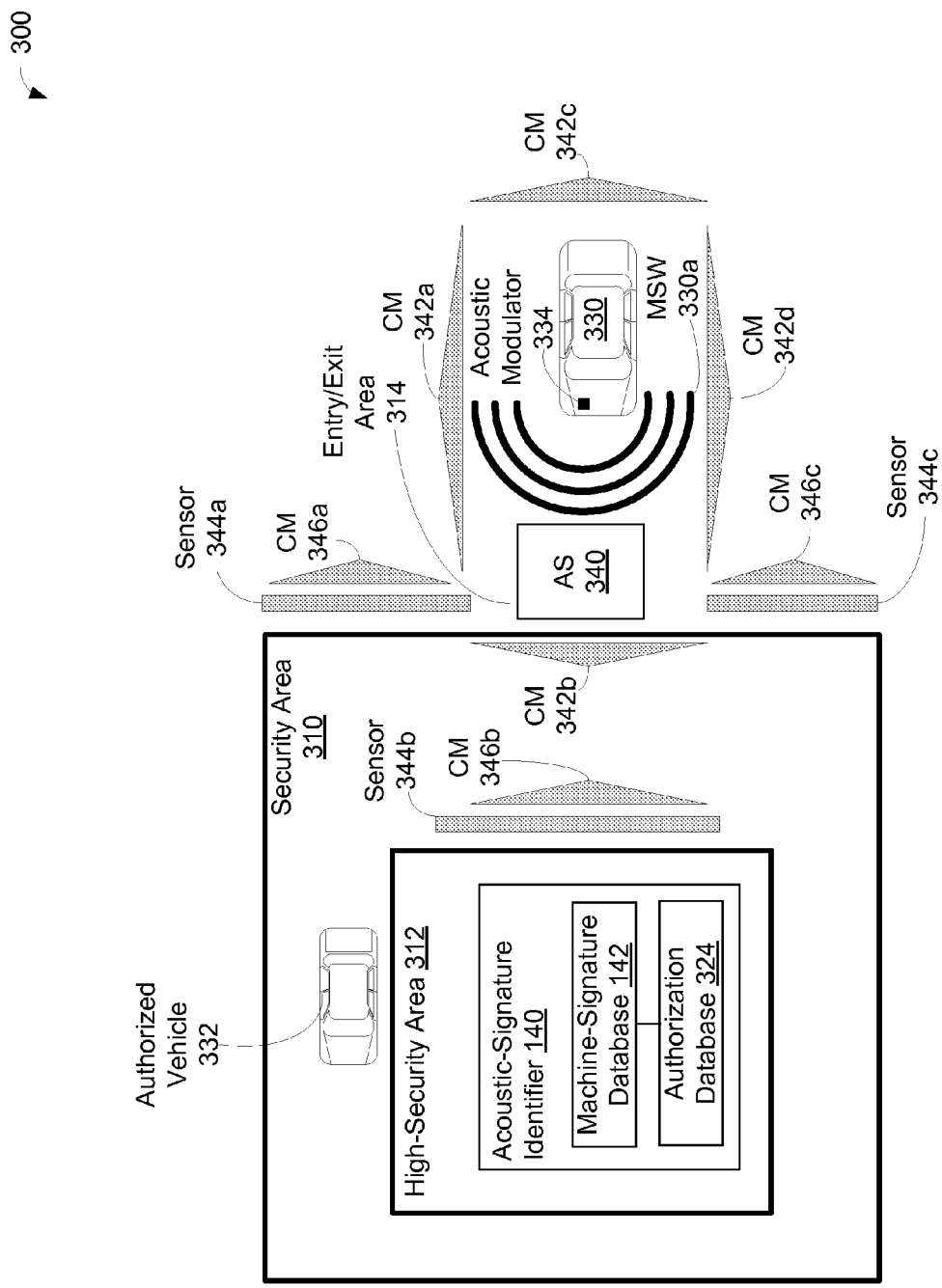
FIG. 3 shows an example scenario for identification of a vehicle prior to entry into a security area, in accordance with the invention.

FIG. 3 shows an example scenario 300 for identification of a vehicle 330 prior to entry into a security area 310, in accordance with the invention.

The scenario shown in FIG. 3 includes a vehicle 330 attempting to enter the security area 310 at an entry/exit area 314. FIG. 3 shows the boundaries of entry/exit area 314 delimited by countermeasures (CMs) 342a, 342b, 342c, and 342d. In the scenario shown in FIG. 3, an authorized vehicle 332 has already entered the security area 310.

FIG. 3 shows a boundary of security area 310 covered by sensors 344a and 344c with corresponding countermeasures 346a and 346c, as well as the corresponding boundary of high-security area 312 covered by sensor 344b and corresponding countermeasure 346b. Additional sensors and/or countermeasures may cover other boundaries and/or locations within security areas 310 and 312—these additional sensors and/or countermeasures are not shown in FIG. 3 to enhance the readability of the figure.

FIG. 3 shows an acoustic-signature identifier 140. The acoustic-signature identifier 140 may connect to the acoustic sensor (AS) 340 as well as to the countermeasures 342a-342d. In some circumstances, the acoustic-signature identifier 140 may connect to each of the sensors 344a-344c as well as to each countermeasure 346a-346c. Connections between acoustic-signature identifier 140, sensors 340 and 344a-344c, and countermeasures 342a-342d and 346a-346d may be made using the connection techniques described above with respect to the acoustic-signature identifier and acoustic sensors described above with respect to FIG. 1 (and as applied to countermeasures 342a-342d and 346a-346d). The connections to sensors 340, 344a, 344b, and 344c and countermeasures 342a-342d and 346a-346d are not shown in FIG. 3 to enhance the readability of the figure.

In some scenarios, the acoustic sensor 340 may be portable to permit ready use by security (or other) personnel ensuring integrity of security areas 310 and/or 312. In other scenarios, acoustic sensor 340 may be one or more acoustic sensors may be permanent, perhaps arranged on one or more sides of the entry/exit area 314. In still other scenarios, both portable and permanent acoustic sensors may be used.

In some embodiments, the acoustic-signature identifier 140 may include the functionality of a countermeasure controller. The Errant Vehicle Application describes the functionality of a countermeasure controller in more detail. The Errant Vehicle Application additionally describes more details on the use of sensors 344a-344c and countermeasures 346a-346c to protect boundaries of security areas 310 and 312.

While acoustic-signature identifier 140 is shown within high-security area 312, it is to be understood that acoustic-signature identifier 140 may be located remotely from the security areas 310 and 312. In that circumstance, the acoustic-signature identifier 140 may communicate with sensor 340, sensors 344a-344c, countermeasures 342a-342d and/or countermeasures 346a-346d via a network such as described above with respect to FIG. 1 (not shown).

FIG. 3 shows vehicle 330 attempting to enter the security area 310 at an entry/exit area 312. Before entry of vehicle 330 into security area 310, acoustic sensor 340 may generate machine-acoustic data from machine sound waves 330a emanating from vehicle 330. Using the techniques described above with respect to FIG. 1, acoustic sensor 340 may send the machine-acoustic data to acoustic-signature identifier 140.

The operation of vehicle 330 and/or acoustic modulator 334 may generate the machine sound waves 330c. The acoustic modulator 334 may generate sound waves using one or more carrier frequencies. The acoustic modulator 334 may be and/or include a signal generator, function generator, tone generator, arbitrary waveform generator, digital pattern generator, loudspeaker, ultrasound emitter, ultrasound modulator, and/or other audio generator and/or modulator(s).

In particular, acoustic modulator 334 may use and/or modulate one or more carrier frequencies to generate some or all of machine sound waves 330c. The acoustic modulator 334 may modulate the one or more carrier frequencies to include encoded data. For example, the acoustic modulator 334 may use Morse code, a binary code, a multi-frequency code, and/or other encoding techniques to provide encoded data. The encoded data may be or include identification information. In such embodiments, the acoustic-signature identifier 140 may determine a machine signature for vehicle 330 based on the encoded data.

The one or more carrier frequencies may include ultrasonic frequencies. Acoustic modulator 334 may generate ultrasonic frequencies to reduce the chance of detection and/or copying of encoded data by casual observation (i.e., overhearing and/or recording of the data encoded by acoustic modulator 334).

For example, acoustic modulator 334 may emit three 120-millisecond-long signals at 100 kHz per second to identify a specific vehicle. As such, the machine signature for vehicle 330 may be or include the three 100 kHz 120-millisecond-long signals. In such scenarios, an engine of the vehicle 330 may be turned off to enhance detection of the signals generated by the acoustic modulator 334.

Upon receiving the machine-acoustic data, the acoustic-signature identifier 140 may send an instruction to admit or deny admission to vehicle 330. The acoustic-signature identifier 140 may determine a machine signature for vehicle 330 based on the machine-acoustic data using the techniques described with respect to FIG. 1 and/or the techniques described above using acoustic modulator 334. Using the machine signature, the acoustic-signature identifier 140 may partially and/or completely identify vehicle 330 based on the techniques described above with respect to FIG. 1.

Upon identifying vehicle 330, the acoustic-signature identifier 140 may query authorization database 324 using a query based on identification information. The identification information may be as described above with respect to FIG. 1. For example, the acoustic-signature identifier 140 may query authorization database 324 using license plate information stored in machine-signature database 142 associated with a machine signature. The authorization database 324 may in turn return a query result. The query result may indicate the vehicle associated with the identification information is either authorized or not authorized to enter security area 310. In some circumstances, the query result may indicate that additional identification information is required prior to entry; e.g., the driver of vehicle 330 must be identified as well as vehicle 330. The Errant Vehicle Application describes the authorization database 324 in more detail.

Note that while FIG. 3 shows the authorization database 324 as part of the acoustic-signature identifier 140, the authorization database 324 may be on a separate computing device than the acoustic-signature identifier 140, and, thus, the authorization database 324 and acoustic-signature identifier 140, may be connected, either directly or via a network.

The acoustic-signature identifier 140 may generate an instruction based on the query result from authorization database 324. For example, the acoustic-signature identifier 140 may generate an instruction to admit vehicle 330 into security area if the query result from authorization database 324 indicates vehicle 330 is authorized to enter security area 310. Similarly, the acoustic-signature identifier 140 may generate an instruction to deny admission to vehicle 330 into security area if: (a) the query result from authorization database 324 indicates vehicle 330 is not authorized to enter security area 310, (b) a complete identification of vehicle 330 is unavailable (c) a matching confidence index of a partial or complete identification of vehicle 330 is below a threshold, and/or (d) an instruction to request additional identification information if the query result indicates that additional identification information is required prior to entry of vehicle 330. Other circumstances for generating an instruction to admit or deny admission are possible as well.

Once generated, the acoustic-signature identifier 140 may send the instruction using the techniques described above with respect to FIG. 1.

The instruction to deny admission to vehicle 330 may be a combined instruction. In particular, the instruction to deny admission may include instruction(s) to apply countermeasures 342a-342d and/or 346a-346c to vehicle 330. The countermeasures 342a-342d and 346a-346c may utilize the countermeasure technologies and techniques described in the Errant Vehicle Application. Also, entry and exit of vehicles may be tracked, perhaps as data within authorization database 324, as described in more detail in the Errant Vehicle Application.

An Example Computing Device

Figure 4:
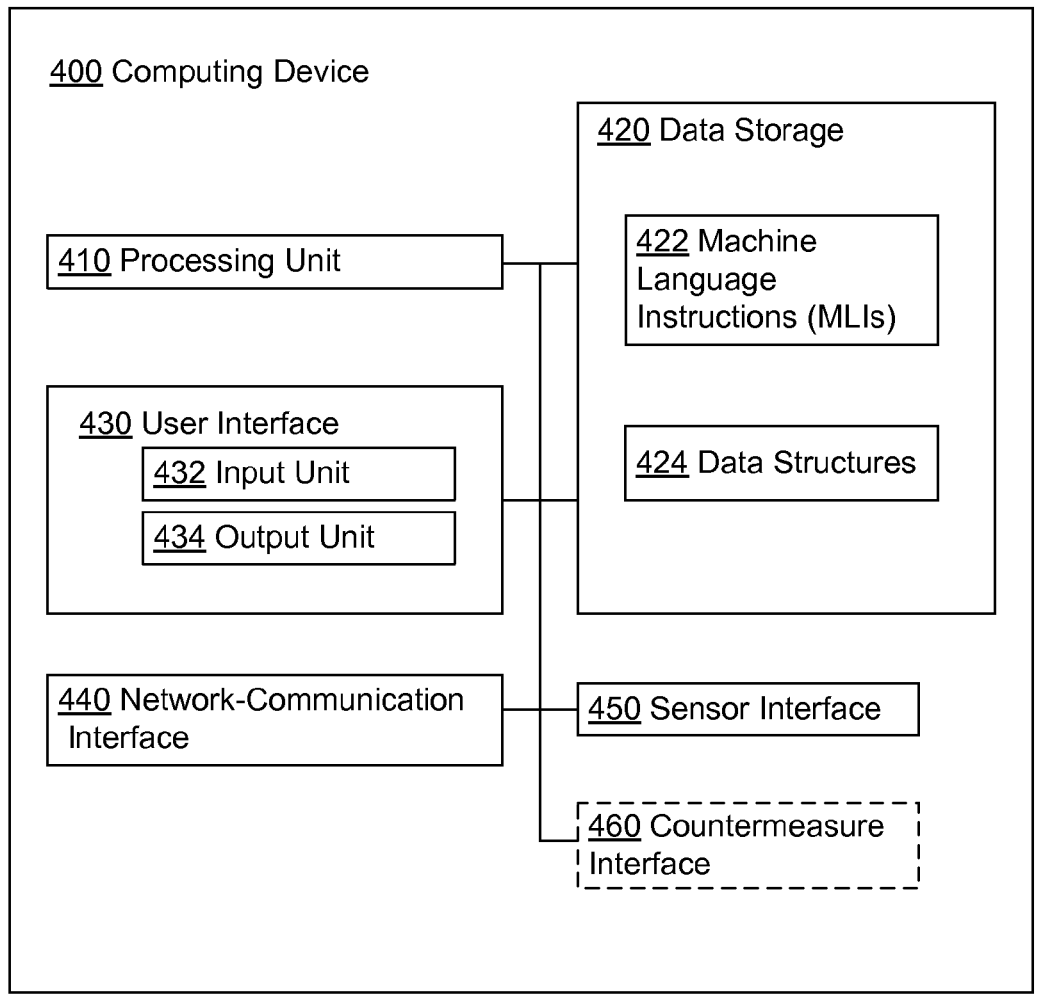
FIG. 4 is a block diagram of an example computing device, in accordance with the invention.

FIG. 4 is a block diagram of an example computing device 400, comprising a processing unit 410, data storage 420, a user interface 430, a network-communication interface 440, a sensor interface 450, and a countermeasure interface 460, in accordance with embodiments of the invention. A computing device 400 may be a desktop computer, laptop or notebook computer, personal data assistant (PDA), mobile phone, embedded processor, or any similar device that is equipped with a processing unit capable of executing machine-language instructions that implement at least part of the herein-described methods 500 described in more detail below with respect to FIG. 5, and/or herein-described functionality of an acoustic-signature identifier, acoustic sensor, acoustic modulator, network, ECM device, VCM device, machine-signature database, an authorization database, and/or a security device.

The processing unit 410 may include one or more central processing units, computer processors, mobile processors, digital signal processors (DSPs), microprocessors, computer chips, and similar processing units now known and later developed and may execute machine-language instructions and process data.

The data storage 420 may comprise one or more storage devices. The data storage 420 may include read-only memory (ROM), random access memory (RAM), removable-disk-drive memory, hard-disk memory, magnetic-tape memory, flash memory, and similar storage devices now known and later developed. The data storage 420 comprises at least enough storage capacity to contain machine-language instructions 422 and data structures 424.

The machine-language instructions 422 and the data structures 424 contained in the data storage 420 include instructions executable by the processing unit 410 and any storage required, respectively, to perform at least part of the herein-described methods 500 described in more detail below with respect to FIG. 5, and/or perform the herein-described functionality of an acoustic-signature identifier, acoustic sensor, acoustic modulator, network, ECM device, VCM device, machine-signature database, an authorization database, and/or a security device.

The terms tangible computer-readable medium and tangible computer-readable media, as used herein, refer to any tangible medium that can be configured to store instructions, such as machine-language instructions 422, for execution by a processing unit and/or computing device; e.g., processing unit 410. Such a medium may take many forms, including but not limited to, non-volatile media and volatile media. Non-volatile media includes, for example, ROM, flash memory, magnetic-disk memory, optical-disk memory, removable-disk memory, magnetic-tape memory, and paper cards. Volatile media include dynamic memory, such as main memory or RAM. As such, the herein-described data storage 420 may comprise and/or be one or more tangible computer-readable media.

The user interface 430 may comprise an input unit 432 and/or an output unit 434. The input unit 432 may receive user input from a user of the computing device 400. The input unit 432 may comprise a keyboard, a keypad, a touch screen, a computer mouse, a track ball, a joystick, and/or other similar devices, now known or later developed, capable of receiving user input from a user of the computing device 400.

The output unit 434 may provide output to a user of the computing device 400. The output unit 434 may comprise a visible output device for generating visual output(s), such as one or more cathode ray tubes (CRT), liquid crystal displays (LCD), light emitting diodes (LEDs), displays using digital light processing (DLP) technology, printers, light bulbs, and/or other similar devices, now known or later developed, capable of displaying graphical, textual, and/or numerical information to a user of computing device 400. The output unit 434 may alternately or additionally comprise one or more aural output devices for generating audible output(s), such as a speaker, speaker jack, audio output port, audio output device, earphones, and/or other similar devices, now known or later developed, capable of conveying sound and/or audible information to a user of computing device 400.

The network-communication interface 440 may be configured to send and receive data over a wired-communication interface and/or a wireless-communication interface. The wired-communication interface, if present, may comprise a wire, cable, fiber-optic link or similar physical connection to a data network, such as a wide area network (WAN), a local area network (LAN), one or more public data networks, such as the Internet, one or more private data networks, or any combination of such networks. The wireless-communication interface, if present, may utilize an air interface, such as a ZigBee, Wi-Fi, and/or WiMAX interface to a data network, such as a WAN, a LAN, one or more public data networks (e.g., the Internet), one or more private data networks, or any combination of public and private data networks. In some embodiments, the network-communication interface 440 is configured to send and/or receive data over multiple communication frequencies, as well as being able to select a communication frequency out of the multiple communication frequency for utilization.

The sensor interface 450 may permit communication with one or more sensors, particularly acoustic sensors, to permit the sensors to provide machine-acoustic data to the computing device 400 and/or to receive commands that permit sensor maintenance (e.g., setup commands, configuration parameter settings, and the like). The sensor interface 450 may include a wired-sensor interface and/or a wireless-sensor interface. The wired-sensor interface and the wireless-sensor interface may utilize the technologies described above with respect to the wired-communication interface of the network-communication interface 440 and the wireless-communication interface of the network-communication interface 440, respectively. In some embodiments, one or more acoustic sensors (or other sensors) may be part of sensor interface 450. In other embodiments, one or more acoustic modulators may be part of sensor interface 450.

The countermeasure interface 460 may permit communication with one or more countermeasures. The countermeasure interface 460 is optionally part of computing device 460 as indicated by dashed lines in FIG. 4. The countermeasure interface 460 is described in more detail in the Errant Vehicle Application.

Example Method for Sending Instructions for an Identified Machine

Figure 5:
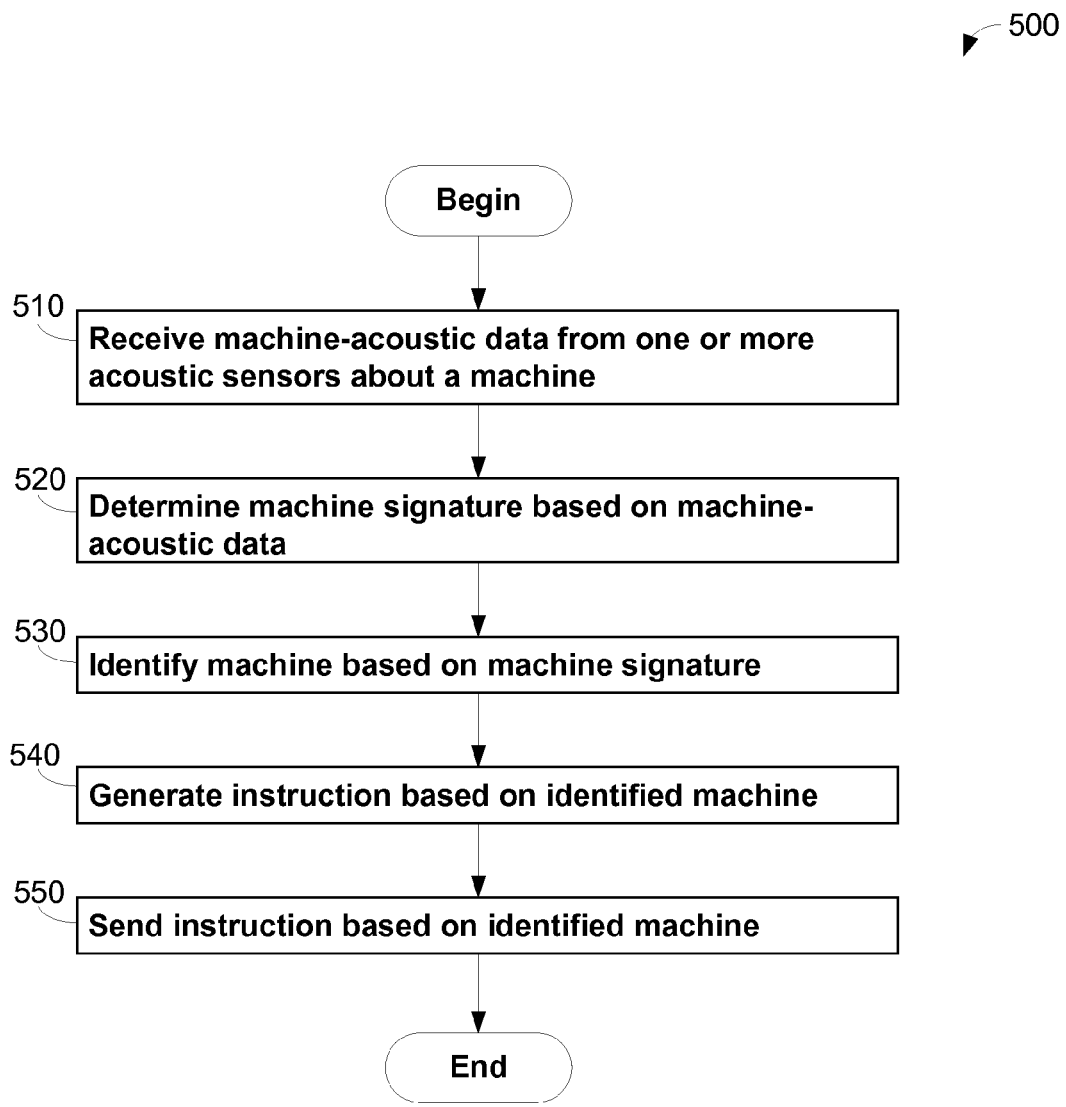
FIG. 5 is a flowchart depicting an example method for sending instructions for an identified machine, in accordance with the invention.

FIG. 5 is a flowchart depicting an example method 500 for sending instructions for an identified machine, in accordance with the invention. It should be understood that each block in this flowchart and within any other flowcharts presented herein may represent a module, segment, or portion of computer program code, which includes one or more executable instructions for implementing specific logical functions or steps in the process. Alternate implementations are included within the scope of the example embodiments in which functions may be executed out of order from that shown or discussed, including substantially concurrently or in reverse order, depending on the functionality involved, as would be understood by those reasonably skilled in the art of the described embodiments.

Method 500 begins at block 510. At block 510, machine-acoustic data about a machine is received. The machine-acoustic data may include machine sound waves generated by a machine and/or an acoustic modulator, as described above with respect to FIGS. 1 and 3. One or more acoustic sensors may generate the machine-acoustic data, as described above with respect to FIG. 1. An acoustic-signature identifier may receive the machine-acoustic data using the techniques described above with respect to FIG. 1.

At block 520, a machine signature may be determined based on the machine-acoustic data. The acoustic-signature identifier may determine the machine signature using the techniques described above with respect to FIGS. 1 and 3.

At block 530, the machine may be identified based on the machine signature. The acoustic-signature identifier may identify the machine using the techniques described above, especially with respect to FIGS. 1 and 3.

In particular, the machine may be identified with a partial and/or complete identification. A matching confidence index may be associated with each partial and/or complete identification. A search for the machine signature may be a guided search using query limitations. The search may use machine-signature templates as well to guide the search and/or to provide partial and/or complete identifications of the machine. The acoustic-signature identifier may use machine-aging models and/or delta signatures, perhaps applied to an input-machine signature and/or a baseline-machine signature, to partially and/or completely identify the machine.

At block 540, an instruction may be generated based on the identified machine. The acoustic-signature identifier may generate the instruction using the techniques described above with respect to FIG. 1. The instruction may be an informational instruction, an instruction to apply countermeasures, an instruction to admit or deny entry into a secured area, and/or a combined instruction as described above with respect to FIGS. 1, 2, and 3.

At block 550, the instruction may be sent. The acoustic-signature identifier may send the instruction using the techniques described above with respect to FIG. 1. The instruction may be sent and/or the machine-acoustic data of block 510 may be received via a network-communication interface and/or a sensor interface described above with respect to FIG. 4.

After completing the procedures of block 550, method 500 may end.

Conclusion

Exemplary embodiments of the present invention have been described above. Those skilled in the art will understand, however, that changes and modifications may be made to the embodiments described without departing from the true scope and spirit of the present invention, which is defined by the claims. It should be understood, however, that this and other arrangements described in detail herein are provided for purposes of example only and that the invention encompasses all modifications and enhancements within the scope and spirit of the following claims. As such, those skilled in the art will appreciate that other arrangements and other elements (e.g. machines, interfaces, functions, orders, and groupings of functions, etc.) can be used instead, and some elements may be omitted altogether.

Further, many of the elements described herein are functional entities that may be implemented as discrete or distributed components or in conjunction with other components, in any suitable combination and location, and as any suitable combination of hardware, firmware, and/or software.

What is claimed is:

1. A method, comprising:
receiving machine-acoustic data from one or more acoustic sensors;
determining, with an acoustic-signature identifier, a machine signature based on the machine-acoustic data, wherein the machine signature is associated with only one individual machine of a plurality of machines;
performing, with the acoustic-signature identifier, a complete identification of the individual machine based on the machine signature, wherein performing the complete identification comprises identifying the only one individual machine based on the machine signature; and
sending an instruction from the acoustic-signature identifier based on identifying the individual machine.

2. The method of claim 1, wherein performing a complete identification of the individual machine comprises identifying the machine signature among a plurality of machine signatures, wherein the plurality of machine signatures are stored in a database on a computing device, and wherein each machine signature of the plurality of machine signatures is associated with a respective individual machine.

3. The method of claim 2, wherein sending the instruction comprises sending the instruction responsive to identifying the machine signature among the plurality of machine.

4. The method of claim 1, wherein the instruction comprises an instruction to apply a countermeasure to the individual machine.

5. The method of claim 1, wherein the machine-acoustic data comprises audio data of the individual machine in operation.

6. The method of claim 1, wherein the machine-acoustic data comprises modulated acoustic data generated by an acoustic modulator.

7. A system comprising:
a communication interface; and
an acoustic-signature identifier configure to:
received machine-acoustic data from one or more acoustic sensors,
determine a machine signature based on the machine-acoustic data, wherein the machine signature is associated with only one individual machine of a plurality of machines,
perform a complete identification of the individual machine based on the machine signature by at least identifying the only one individual machine based on the machine signature, and
send an instruction, via the communication interface, based on identifying the individual machine.

8. The system of claim 7, further comprising data storage storing a machine-signature database, wherein the machine-signature database stores a plurality of machine signatures, wherein each machine signature of the plurality of machine signatures is associated with a respective individual machine in the machine-signature database, and wherein the acoustic-signature identifier is configured to perform a complete identification of the individual machine by at least selecting the machine signature from among the plurality of machine signatures.

9. The method of claim 4, wherein the countermeasure comprises an electronic countermeasure applied to the individual machine, the electronic countermeasure being configured to stop the individual machine.

10. The method of claim 4, wherein the instruction to apply a countermeasure to the individual machine causes a plurality of countermeasures to be applied to the individual machine in a sequential order.

11. The method of claim 1, wherein performing a complete identification of the individual machine based on the machine signature comprises:
updating stored machine-acoustic data via a machine-aging model, the stored machine-acoustic data being associated with the individual machine; and
comparing the machine signature to the updated machine-acoustic data.

12. The system of claim 7, wherein the machine-acoustic data comprises modulated acoustic data generated by an acoustic modulator.

13. The system of claim 12, wherein the modulated acoustic data utilizes an ultra frequency as a carrier.

14. The system of claim 7, wherein the instruction comprises an instruction to apply a countermeasure to the individual machine.

15. The system of claim 7, wherein the machine signature comprises a delta signature generated based on updated-machine-acoustic data for the individual machine.

16. The system of claim 7, further comprising data storage that stores old machine-acoustic data, wherein the acoustic-signature identifier is configured to perform a complete identification of the individual machine based on the machine signature by at least:
updating the old machine-acoustic data via a machine-aging model, the stored machine-acoustic data being associated with the individual machine; and
comparing the machine signature to the updated machine-acoustic data.

17. The system of claim 8, wherein the data storage further stores identification information for each respective machine associated with a machine signature of the plurality of machine signatures, the identification information including at least one of manufacturer information, model information, age of the respective machine, size of the respective machine, shape of the respective machine, color of the respective machine, an identification number associated with the respective machine, a licensing information, a serial number, or a part number.

18. The method of claim 1, wherein the instruction comprises one of:
an instruction to permit the individual machine access into a secured area, or
an instruction to deny the individual machine access into the secured area.

19. The system of claim 7, wherein the instruction comprises one of:
an instruction to permit the individual machine access into a secured area, or
an instruction to deny the individual machine access into the secured.

20. The system of claim 8, wherein the acoustic-signature identifier is configured to determine at least one of an identification number associated with the individual machine, or a serial number associated with the individual machine based on the machine signature.

* * * * *